(12) United States Patent
Barnes et al.

(10) Patent No.: US 7,943,888 B2
(45) Date of Patent: May 17, 2011

(54) SLOW COOKER WITH NESTABLE CONTAINERS

(75) Inventors: John Barnes, Richmond, VA (US); Yvonne Olson, Richmond, VA (US); David Jackson, Mechanicsville, VA (US); James Gaynor, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1130 days.

(21) Appl. No.: 11/623,485

(22) Filed: Jan. 16, 2007

(65) Prior Publication Data

US 2008/0169280 A1 Jul. 17, 2008

(51) Int. Cl.
*A47J 27/00* (2006.01)
*A47J 27/12* (2006.01)
*A47J 36/00* (2006.01)
*A47J 36/16* (2006.01)

(52) U.S. Cl. .......... 219/432; 219/433; 219/442; 99/340; 99/403

(58) Field of Classification Search .............. 219/433
See application file for complete search history.

(56) References Cited

U.S. PATENT DOCUMENTS

| D22,155 S | 1/1893 | Haynes |
|---|---|---|
| 797,314 A | 8/1905 | Owens |
| D38,873 S | 11/1907 | Meakin |
| D87,677 S | 8/1932 | Osius |
| D115,298 S | 6/1939 | Platt |
| 2,187,888 A * | 1/1940 | Nachumsohn ............ 219/417 |
| 2,202,320 A | 5/1940 | Sacerdote |
| 2,414,868 A | 1/1947 | Gunther |
| 2,682,602 A | 6/1954 | Huck |
| D172,552 S | 7/1954 | Perl et al. |

(Continued)

FOREIGN PATENT DOCUMENTS

CN 2255225 Y 6/1997

OTHER PUBLICATIONS

Office Action Issued Oct. 12, 2010 in China Appln. Serial 200810002357.8.

*Primary Examiner* — Joseph M Pelham
(74) *Attorney, Agent, or Firm* — Panitch Schwarze Belisario & Nadel LLP

(57) ABSTRACT

A slow cooker includes a cooking base having a heating element and an open end. The slow cooker has a first container sized to fit within the open end of the cooking base. The first container has an opening for receiving foodstuff. The volume of the first container is sized to accommodate a second container. The second container has an opening for receiving foodstuff. The opening of the second container is generally equal in size to the opening of the first container. The first container has a cooking position wherein the first container is inserted in the cooking base. The second container has a cooking position wherein the second container is inserted in the cooking base. The first container and second container have a storage position, wherein the second container is nested within the first container. The slow cooker also includes a lid that is sized to enclose the opening of either of the first and second containers during their respective cooking positions. The lid is also sized to enclose the opening of the second container when in the storage position.

8 Claims, 4 Drawing Sheets

U.S. PATENT DOCUMENTS

| | | |
|---|---|---|
| 2,800,310 A | 7/1957 | Snyder |
| 2,823,290 A | 2/1958 | Warner |
| 3,051,303 A | 8/1962 | Daanen et al. |
| 3,087,413 A * | 4/1963 | Burroughs ............... 99/352 |
| 3,094,258 A | 6/1963 | Punke |
| 3,246,122 A | 4/1966 | Wetzel |
| 3,313,919 A | 4/1967 | Richardson et al. |
| 3,395,266 A | 7/1968 | Price |
| 3,908,111 A | 9/1975 | Du Bois et al. |
| 4,204,609 A | 5/1980 | Kuhn |
| 4,243,873 A | 1/1981 | Helgesen |
| 4,307,287 A | 12/1981 | Weiss |
| 4,483,317 A | 11/1984 | Masters |
| 4,646,628 A * | 3/1987 | Lederman ............... 99/413 |
| 4,951,832 A | 8/1990 | Tenney et al. |
| D368,626 S | 4/1996 | Hentz |
| 5,984,156 A | 11/1999 | Bridges |
| D420,247 S | 2/2000 | Kaney et al. |
| 6,111,239 A | 8/2000 | Park |
| D437,182 S | 2/2001 | Choi |
| 6,188,046 B1 | 2/2001 | Barrow |
| 6,248,982 B1 | 6/2001 | Reid et al. |
| D444,342 S | 7/2001 | Kruepke et al. |
| 6,259,068 B1 | 7/2001 | Barrow |
| 6,274,847 B1 | 8/2001 | Hlava et al. |
| D453,091 S | 1/2002 | Gouthiere |
| 6,373,031 B1 | 4/2002 | Barrow |
| 6,570,139 B1 | 5/2003 | Levy et al. |
| 6,573,483 B1 | 6/2003 | DeCobert et al. |
| 6,587,739 B1 | 7/2003 | Abrams et al. |
| 6,593,552 B1 * | 7/2003 | Li ............... 219/432 |
| D479,432 S | 9/2003 | Barker |
| 6,653,602 B2 * | 11/2003 | Li ............... 219/432 |
| 6,729,472 B2 | 5/2004 | Stucke et al. |
| 6,740,855 B1 | 5/2004 | DeCobert et al. |
| D496,555 S | 9/2004 | Rommelfanger et al. |
| 6,796,430 B2 | 9/2004 | Mercier et al. |
| 6,867,394 B2 * | 3/2005 | Li ............... 219/433 |
| 6,872,921 B1 | 3/2005 | DeCobert et al. |
| D503,584 S | 4/2005 | White et al. |
| 6,884,971 B2 | 4/2005 | Li |
| 6,927,365 B2 * | 8/2005 | Li ............... 219/432 |
| D517,857 S | 3/2006 | Poon |
| 7,009,149 B2 | 3/2006 | White et al. |
| 2001/0035402 A1 * | 11/2001 | Barrow ............... 219/432 |
| 2004/0262287 A1 * | 12/2004 | Ragan et al. ............... 219/438 |
| 2005/0029249 A1 | 2/2005 | Wanat |
| 2009/0095169 A1 * | 4/2009 | York ............... 99/448 |

* cited by examiner

SLOW COOKER WITH NESTABLE CONTAINERS

BACKGROUND OF THE INVENTION

This invention relates to a food-heating appliance and more particularly to a food-heating appliance having a plurality of nestable cooking containers of different volumes.

Conventional food-heating appliances, or slow cookers, have a heating unit and a cooking unit. The heating unit typically has one or more electric heating elements adapted to supply heat to the cooking unit. The cooking unit is typically made of ceramic and is adapted to work in conjunction with the heating unit to cook food products in a slow, uniform fashion. The slow cooker cooks in a steady, even manner because the ceramic container or "crockery" cooking unit conducts heat evenly within the cooking chamber. Furthermore, the ceramic sidewalls of the crockery conduct and hold heat for an extended period of time to level any fluctuations in temperature if the heating element in the heating unit cycles on and off.

Improved cooking performance has been shown when the crockery is ¾ full while slow cooking. Conventional slow cookers, however, utilize a single cooking container or crock having a set volume. The heating unit is configured to heat only a certain sized container. This is a disadvantage when different volumes of food or a different heating time is required. In the past, if a consumer wished to use different size crockery, then either the crockery was less than ¾ full or more than one slow cooker was required. It is desirable therefore, to have crockery of different volumes that are easily storable and used in conjunction with a single controllable heating unit. Further, it is desirable to have a heating element that provides for different levels of heat depending on the size of the crockery being used.

BRIEF SUMMARY OF THE INVENTION

Briefly stated, the present invention is directed to a slow cooker. The slow cooker includes a cooking base having at least one heating element and an open end. The slow cooker has a first container and a second container. The first container has a bottom having a periphery and a wall that extends generally upwardly from the bottom periphery. The first container bottom and at least a portion of the first container wall are sized to fit within the open end of the cooking base. The first container bottom and first container wall define a first container interior having a first volume. The first container interior has an opening for receiving foodstuff. The first volume of the first container interior is sized to at least partially accommodate the second container. The second container includes a bottom having a periphery and a wall that extends generally upwardly from the bottom periphery. The second container bottom and at least a portion of the second container wall are sized to fit within the open end of the cooking base and within the first container interior. The second container bottom and second container wall define a second container interior having a second volume. The second container interior has an opening for receiving foodstuff. The first container has a cooking position wherein the first container bottom is inserted in the open end of the cooking base. The second container has a cooking position wherein the second container bottom is inserted in the open end of the cooking base. The first container and second containers have a storage position, wherein the second container is nested within the first container interior. The slow cooker also includes a lid sized to enclose the opening of either of the first and second containers when in the respective cooking positions. The lid is also sized to enclose the opening of the second container when in the storage position.

In another aspect, the invention is directed to a slow cooker having at least two different size containers for holding foodstuff. The slower cooker includes a cooking base having at least one heating element and an open end. The at least one heating elements heats the selected container. The base includes a selector control for selecting a heat setting and at least two actuators for selecting a container size. The slow cooker includes a controller that receives the selected heat setting and the selected container size. The controller controls the duty cycle of the heating element according to the selected heat setting and selected container size. The heating element emits the highest amount of heat for the largest container set on the highest heat setting and the lowest amount of heat for the smallest container set on the lowest heat setting.

In another aspect, the invention is directed to a slow cooker having at least three different sized containers for holding foodstuff. The slow cooker includes a cooking base that has at least three parallel heating elements for emitting heat. The base has an open end thermally exposing the at least three heating elements for engagement by a selected container. The at least three heating elements heats the selected container. The base includes a selector control for selecting a heat setting and a plurality of actuators for selecting a container size. The at least three heating elements are activated according to the selected heat setting and selected container size. A single heating element is activated for the lowest selected heat setting and additional heating elements are added as the heat setting and container size selection is increased.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
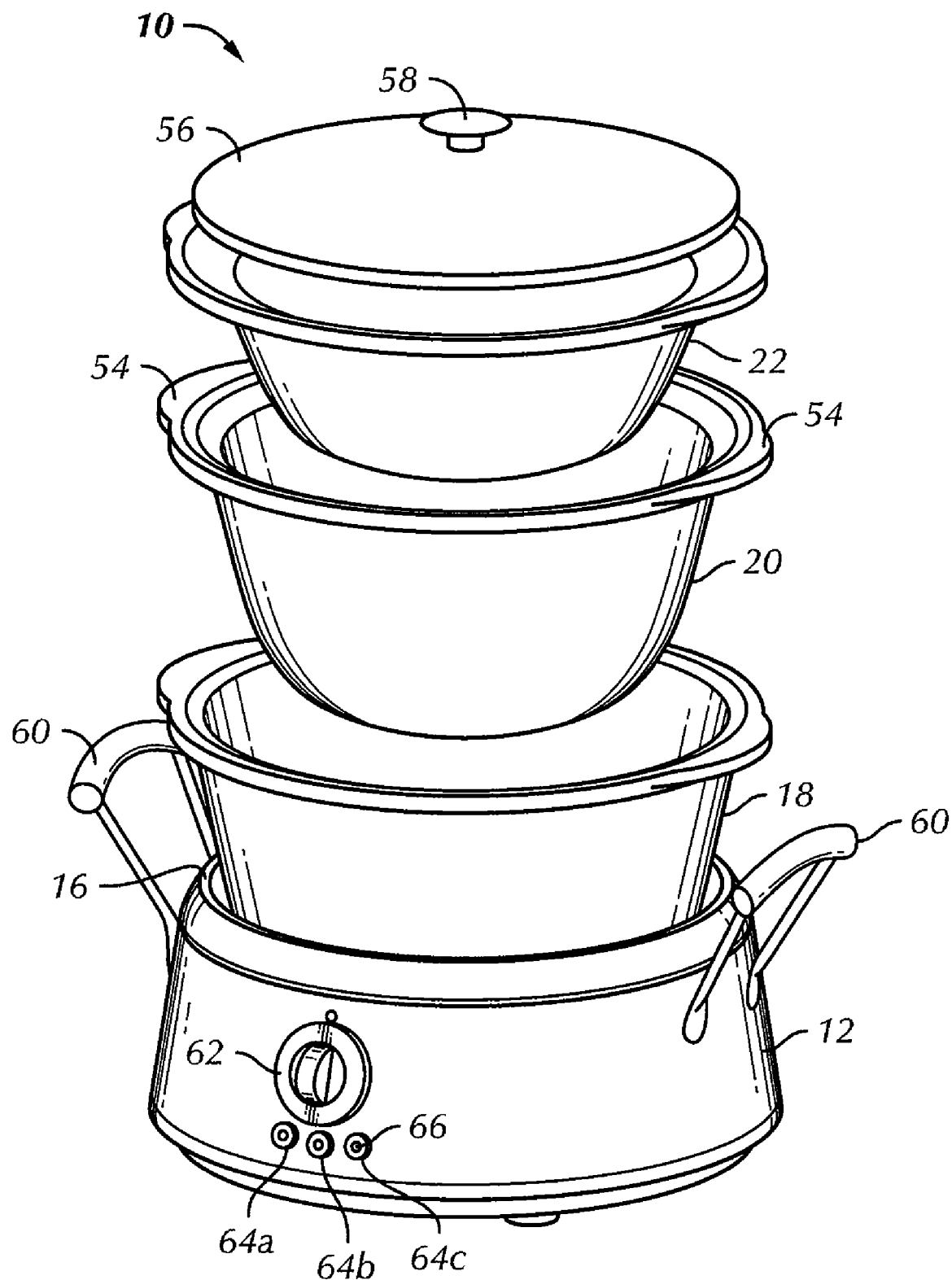
FIG. 1 is an exploded perspective view of a preferred embodiment of a slow cooker in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a slow cooker in accordance with the present invention, and designated parts thereof. The terminology includes the words noted above, derivatives thereof and words of similar import.

Figure 2:
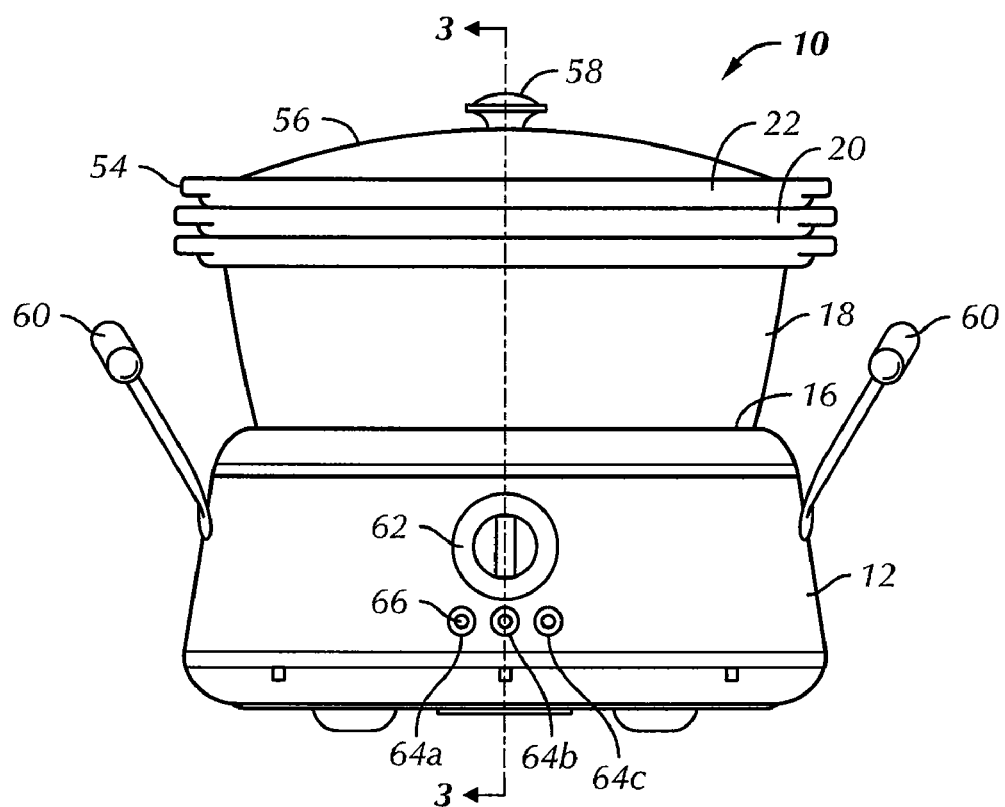
FIG. 2 is a front elevational view of the slow cooker shown in FIG. 1 with the containers in a storage position.
Figure 3:
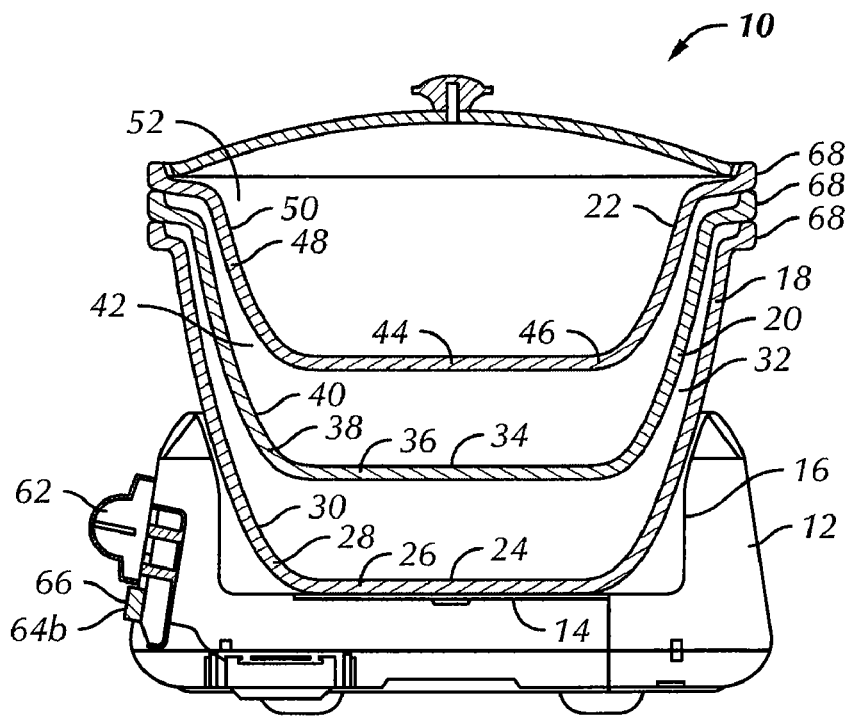
FIG. 3 is a cross sectional view of the slow cooker shown in FIG. 2 taken along line 3-3.

Referring to FIGS. 1-3, a slow cooker with nestable containers, generally designated 10, is comprised of a cooking base 12 and a plurality (only three shown) of cooking containers or crocks 18, 20, 22. The cooking base 12 includes at least one heating element 14 (See FIG. 3). The cooking base 12 has an open top end 16. The open end 16 of the cooking base 12 is formed into a recessed cavity on top of the cooking base 12 and thermally exposes the at least one heating element 14. The at least one heating element 14 is positioned beneath the horizontal surface of the open end 16 as shown in FIG. 3 or may be positioned around the sidewall of the open end 16 as discussed further below.

In the preferred embodiment, the slow cooker with nestable containers 10 includes a first container 18, a second container 20 and a third container 22. In the preferred embodiment all of the containers 18, 20, 22 are the same shape, generally circular in top plan view. More specifically, it is preferred that an entire periphery of each of at least the first and second containers 18, 20 have the same general shape. The slow cooker with nestable containers 10 may include additional containers and is not limited to two or three containers shown and described below. The first container 18 includes a bottom 24 having a periphery 26 and a wall 28 extending generally upwardly from the bottom periphery 26. The first container bottom 24 and at least a portion of the first container wall 28 are sized to fit within the open end 16 of the cooking base 12 when in the cooking or storage position. The first container bottom 24 and the first container wall 28 define a first container interior 30 having a first volume 32. The first container interior 30 has an opening at the upper end for receiving foodstuff.

The first container 18, as well as the second and third containers 20, 22, may be generally circular, square, rectangular, oval or any other suitable shape. Likewise, the opening at the upper end of the first container 18, as well as the second and third containers 20, 22, may be circular, square, rectangular, oval or any other suitable shape. Preferably each container and the corresponding container opening are the same shape, for example, as shown in FIGS. 1-3, both are generally circular. However, in other embodiments, not shown, the containers 18, 20, 22 and the openings at the upper end of the containers 18, 20, 22 may have different shapes. Preferably, all containers 18, 20, 22 are the same shape and all of the container openings are the same shape but there may be differences in some applications.

The first volume 32 of the first container interior 30 is sized and shaped to at least partially accommodate the second container 20 when in a nested storage position as shown in FIGS. 2 and 3. The second container 20 includes a bottom 34 having a periphery 36 and a wall 38 extending generally upwardly from the bottom periphery 36. The second container bottom 34 and at least a portion of the second container wall 38 are size to fit within the open end 16 of the cooking base 12 when in a cooking position and within the first container interior 30 in a complementary manner when in the nested storage position as shown in FIGS. 2 and 3. The second container bottom 34 and the second container wall 38 define a second container interior 40 having a second volume 42. The second container interior 40 has an opening for receiving foodstuff. The opening of the second container interior 40 is generally equal in size and is the same shape as the opening of the first container 18.

The second volume 42 of the second container interior 40 is sized to at least partially accommodate the third container 22 when in a nested storage position as shown in FIGS. 2 and 3. The third container 22 includes a bottom 44 having a periphery 46 and a wall 48 extending generally upwardly from the bottom periphery 46. The third container bottom 44 and at least a portion of the third container wall 48 is sized to fit within the open end 16 of the cooking base 12 when in the cooking position and within the interior of either the first or second container 18, 20 when in the storage position as shown in FIGS. 2 and 3. The third container bottom 44 and the third container wall 48 define a third container interior 50 having a third volume 52. The third container interior 50 has an opening at the upper end for receiving foodstuff. The opening of the third container interior 50 is generally equal in size and is the same shape as the opening of the first and second containers 18, 20. The first, second, and third containers 18, 20 and 22 generally have the same shape. However, the containers, 18, 20, 22, may have a different shapes as long as the openings are generally the same size and shape. The third container 22 is vertically shorter than the second container 20 and the second container 20 is vertically shorter than the first container 18 so that the volumes 32, 42 and 52 differ. Preferably the first container 18 is six quarts, the second container 20 is four quarts and the third container 22 is two quarts. However the sizes and volumes of the containers 18, 20, 22 may be different.

The containers 18, 20, 22 are preferably made of a ceramic material. The containers 18, 20, 22 may also be made of stainless steel, a ceramic having a metallic appearance, glass or any other thermally conductive material. Preferably the containers 18, 20, 22 also function as serving dishes such that the containers 18, 20, 22 are taken directly from the cooking base 12 and are used to serve food or are placed on a presentable table. The containers 18, 20, 22 may also be used for food storage if desirable. Referring to FIG. 1, the containers 18, 20, 22 include a pair of diametrically opposed handles 54. The handles 54 are used by a user to transport and position the containers 18, 20, 22. The handles 54 are preferably crescent shaped, made of the same material as the containers 18, 20, 22, and extend radially outwardly from the tops of the containers 18, 20, 22 as shown. The handles 54 may alternatively be positioned at an angle or at some other location on the containers 18, 20, 22 or may be made of a an insulating material such as wood or a polymeric material.

The first container 18 has a cooking position as shown in FIGS. 1-3 wherein the first container bottom 24 is directly inserted into the open end 16 of the cooking base 12 with the bottom 24 adjacent to and in thermal contact with the at least one heating element 14. The second container 20 and third container 22 also have cooking positions (not shown) wherein the second or third container bottom 34, 44 is directly inserted into the open end 16 of the cooking base 12 adjacent to and in thermal contact with the at least one heating element 14 without the first container 18 therebetween. The bottoms of the containers 24, 34 and 44 are preferably flat in order to more fully thermally contact the heating element 14 when in the cooking positions. However, the bottoms of the containers 24, 34, and 44 may include recessed grooves or extending legs such that the container bottoms, 24, 34, and 44 are slightly spaced from the supporting surface of the cooking base 12.

Referring to FIG. 2, the first container 18, second container 20, and third container 22 have a storage position wherein the second container 20 is nested within the first container 18 and the third container 22 is nested within the second container 20. The containers 18, 20 and 22 may be stored in the cooking base 12 as shown or separately from the cooking base 12.

The slow cooker with nestable containers 10 includes a single lid 56 having a handle 58 located on its upper surface. The lid 56 is sized to cover and enclose the opening of any of the first, second, third containers 18, 20, 22 during their respective cooking positions and sized to enclose the opening of the second container 20 or the third container 22 in their respective storage positions. The lid 56 is preferably comprised of glass or some other transparent or translucent material in order to permit the contents of the covered container to be viewed during cooking. The lid handle 58 is preferably comprised of a thermally insulated material such as wood or rubber but the lid 56 and handle 58 may be constructed of any other suitable material known in the art. As best shown in FIG. 3, the periphery of the lid 56 engages with a rim 68 at an upper end of the respective sidewall of each of the containers 18, 20, 22. The weight of the lid 56 creates a seal between the rim 68 and the lid 56 to close the opening of each of the containers 18, 20, 22. When excessive pressure builds up in the containers 18, 20, 22 during cooking, the lid 56 is lifted slightly away from the rim 68 to release the excess pressure. Alternatively, a vent or valve (not shown) may be located on the lid 56 to release the excess pressure. Further, an outer edge of the rim 68 of each of the first, second and third containers 18, 20, 22, as measured along a radius emanating from a geometric center of the slow cooker with nestable containers 10, is generally vertically aligned when the first, second and third containers 18, 20, 22 are in the storage position (FIGS. 2 and 3).

The base 12 has a pair of base handles 60 positioned on opposing sides of the base 12. The base handles 60 extend upwardly and radially outwardly from the base 12 to permit the base 12 to be transported without concern of contacting the hot portion of the base 12 or spilling a hot substance on the user's hands. The base 12 includes a control panel comprising of a selector control, in the present embodiment a rotary selector knob 62 and three actuators, in the present embodiment three push button switches 64a, 64b and 64c (collectively referred to as 64). The push button switches 64 are similar to those used in multiple speed blender switches. The selector knob 62 has OFF, WARM, LOW, and HIGH settings (not shown) selected by rotating the selector knob 62. The push button switches 64 correspond to each container size 18, 20, and 22. Each push button switch 64 includes an indicator light 66. The lights 66 are preferably light emitting diodes but may encompass any device known in the art that emits light. Other controls and switches such as tactile switches, capacitive switches, membrane switches and any other control switch known in the art may be used in place of the selector knob 62 and push button switches 64. Additionally, a rotary knob may be used to select the container size and a push button may be used to select the heat setting.

Figure 4:
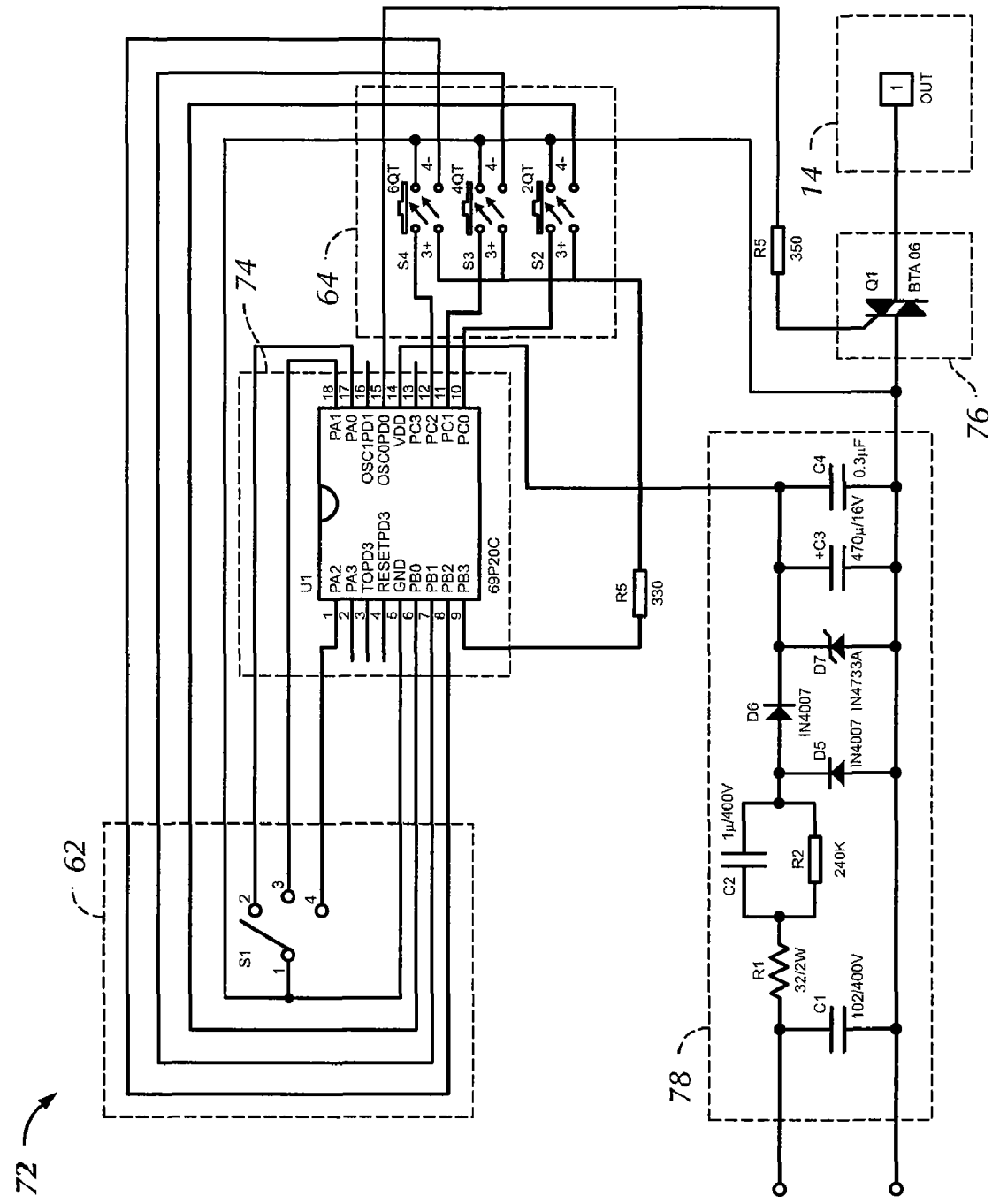
FIG. 4 is a schematic diagram of a first embodiment of a control circuit of the slow cooker shown in FIG. 1.
Figure 5:
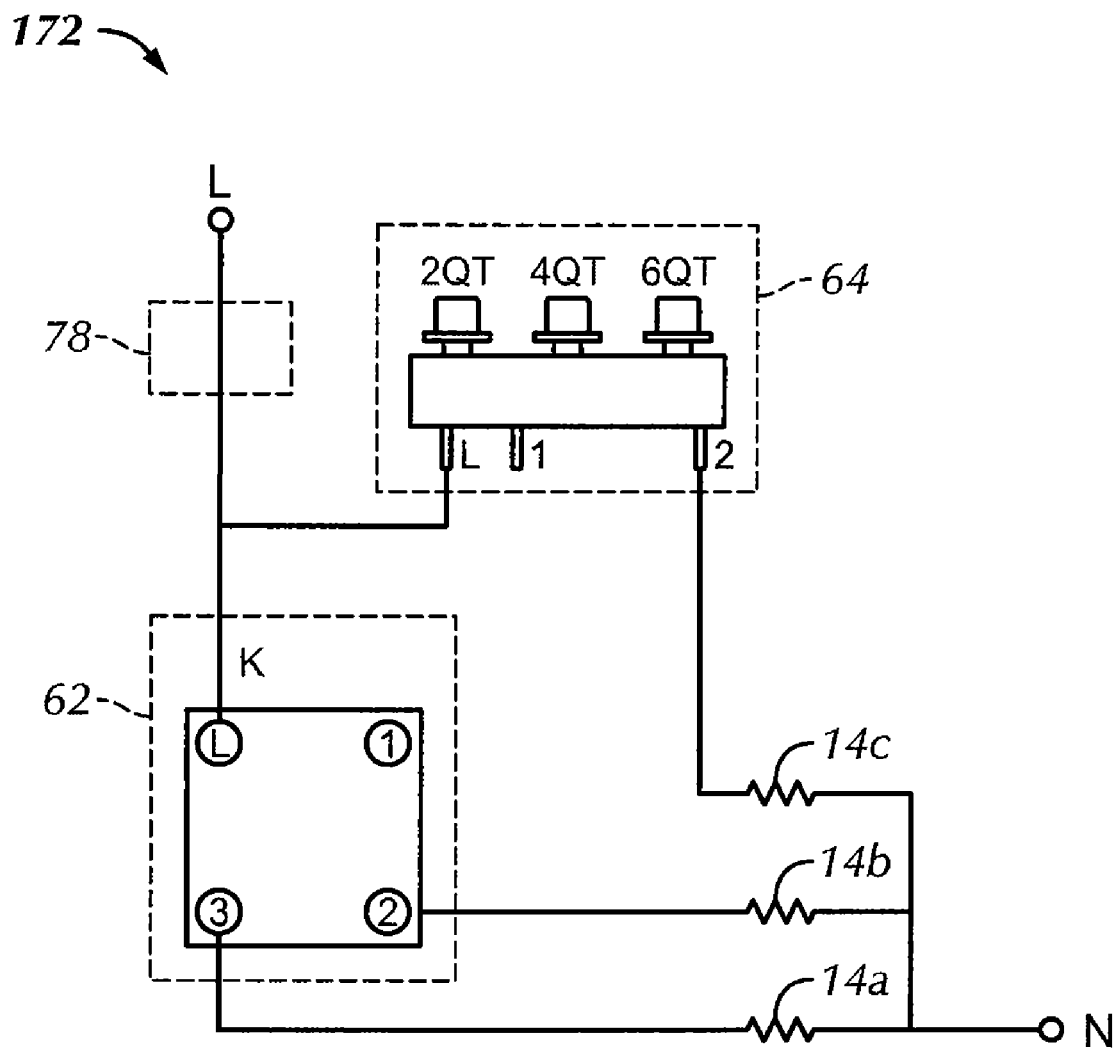
FIG. 5 is a schematic diagram of a second embodiment of a control circuit of the slow cooker shown in FIG. 1.

Referring to FIGS. 4 and 5, the selector knob 62 and the push button switches 64 close mechanical switches which activate the heating element 14. Referring to FIG. 4 a first embodiment of a control circuit 72 includes a controller 74 that receives inputs from the selector control, in the preferred embodiment the four position selector knob 62 and the actuators, in the preferred embodiment, push buttons 64, to control the operation of the heating element 14. In use, the first, second, or third container 18, 20 or 22 is selected and filled with foodstuff. The selected container 18, 20 or 22 is inserted within the open end 16 of the cooking base 12. The user then selects a temperature setting WARM, LOW, HIGH, in ascending heat order, by turning the selector knob 62. The heating element 14 is not activated until a temperature setting is selected. Once a heat setting is selected, the lights 66 on the push buttons 64 flash, prompting the user to select the container size. Once the user selects a container size by depressing the appropriate push button 64 corresponding to the container 18, 20, 22 which has been inserted in the open end 16 of the cooking base 12, the heating element 14 is activated. The controller 74 controls a duty cycle of the heating element 14 to control the heat rate of the heating element 14. In the preferred embodiment, the controlled duty cycle provides full power to the heating element 14 (approximately 256 watts) for the first container 20 on a selected HIGH heat setting. For the other heat settings (WARM and LOW), a triac 76 pulses the heating element 14 to reduce the rate of heating. The third container 22, the smallest container, is heated at the lowest heat rate. Throughout the cooking process, the user may select a different heat rate or container size, and the controller 74 adjusts the heat rate accordingly.

Referring to FIG. 5, a second embodiment of a control circuit 172 includes three individual heating elements 14a, 14b, 14c rather than the conventional use of one or two heating elements. The heating elements 14a, 14b, 14c are directly connected to the selector knob 62 and the push buttons 64 rather than utilizing a controller 74. The heating elements 14a, 14b, 14c are preferably arranged in parallel and wrapped around the sidewall of the open end 16 in a band formation (not shown) toward the bottom-most portion of the open end 16 with the heating elements 14a, 14b, 14c slightly spaced apart from each other. The heating elements 14 may also be positioned along the bottom surface of the open end 16 as shown in FIG. 3. Each heating element 14a, 14b, 14c provides a different heat output. When the heat rate or selected container size is selected, the appropriate heating elements 14a, 14b, 14c are energized to increase or decrease the overall heat generated. The third container 22 and second container 20 utilize two of the heating elements 14a and 14b. Selecting the first container 18 energizes the third heating element 14c. For example, selecting WARM, the lowest heat setting, on the selector knob 62 and depressing one of the push buttons 64a or 64b for the third or second container 20, 22, energizes one heating element 14a. Selecting LOW, the middle heat setting, on the selector knob 62 and depressing one of the push buttons 64a or 64b for the third or second container 20, 22, energizes one heating element 14b that emits a higher heat than the heating element 14a. Selecting HIGH, the highest heat setting, on the selector knob 62 and depressing one of the push buttons 64a or 64b for the third or second container 20, 22, energizes the two heating elements 14a and 14b in parallel. If the first container 18 is selected by depressing push button 64c, the third heating element 14c is energized and an increase in the heat setting selected adds one of or both heat elements 14a and 14b in parallel resulting in an increase in heat for each heat setting. In this preferred configuration, the second and third containers 20, 22 have the same heat settings with an increase in heat for when the first container 18 is selected. Alternatively, additional heating element(s) (not shown) may be added in order to have different heat settings for all three container sizes in a similar manner as described above. In both circuit embodiments described above, the heating elements 14 power off only after the user selects OFF on the selector knob 62. The slow cooker 10 is powered by a power supply 78. The power supply 78 may include a battery contained within the slow cooker 10 or may include a power cord that is plugged into an electrical outlet.

It will be appreciated by those skilled in the art that changes could be made to the embodiments described above without departing from the broad inventive concept thereof. Though the slow cooker with nestable containers 10 is shown and described as having three containers, the slow cooker with nestable containers 10 may have more or fewer containers and corresponding heating components. It is understood, therefore, that this invention is not limited to the particular embodiments disclosed, but it is intended to cover modifications within the spirit and scope of the present invention as defined by the appended claims.

We claim:

1. A slow cooker comprising:
   at least two different size containers for holding foodstuff;
   a cooking base having at least one heating element and an open end, the at least one heating element heating a selected one of the containers, the base including a selector control for selecting a heat setting and at least one actuator for selecting a container size; and
   a controller that receives the selected heat setting and the selected container size, the controller controlling the duty cycle of the heating element according to the selected heat setting and the selected container size, the heating element emitting the highest amount of heat for the largest container set on the highest heat setting and the lowest amount of heat for the smallest container set on the lowest heat setting.

2. The slow cooker of claim 1, wherein the selector control is a rotary knob.

3. The slow cooker of claim 1, wherein the at least one actuator is a push button.

4. The slow cooker of claim 1, wherein the duty cycle comprises pulsing the at least one heating element.

5. A slow cooker comprising:
   at least three different sized containers for holding foodstuff; and
   a cooking base having at least three parallel heating elements for emitting heat, the base having an open end thermally exposing the at least three heating elements for engagement by a selected one of the containers, the at least three heating elements heating the selected one of the containers, the base including a selector control for selecting a heat setting and at least one actuator for selecting a container size; the at least three heating elements activated according to the selected heat setting and selected container size, a single heating element being activated for the lowest selected heat setting and additional heating elements being added as the heat setting and container size selection increases.

6. The slow cooker of claim 5, wherein the selector control is a rotary knob.

7. The slow cooker of claim 5, wherein the at least one actuator is a push button.

8. A slow cooker comprising:
   a cooking base having at least one heating element and an open end;
   a first container and a second container, the first container including a bottom having a periphery and a wall extending generally upwardly from the bottom periphery, the first container bottom and at least a portion of the first container wall being sized to fit within the open end of the cooking base, the first container bottom and first container wall defining a first container interior having a first volume, the first container interior having an opening for receiving foodstuff, the first volume being sized to at least partially accommodate the second container, the second container including a bottom having a periphery and a wall extending generally upwardly from the bottom periphery, the second container bottom and at least a portion of the second container wall being sized to fit within the open end of the cooking base and within the first container interior in a complementary manner, the second container bottom and second container wall defining a second container interior having a second volume, the second container interior having an opening for receiving foodstuff, the entire periphery of each of the first and second containers having the same general shape;
   the first container having a cooking position wherein the first container bottom is directly inserted in the open end of the cooking base;
   the second container having a cooking position wherein the second container bottom is directly inserted in the open end of the cooking base without the first container therebetween;
   the first container and second containers having a storage position, wherein the second container is nested within the first container interior;
   a lid sized to enclose the opening of either of the first and second containers when in the respective cooking positions and sized to enclose the opening of the second container when in the storage position; and
   a selector control for selecting a heating setting, at least one actuator for selecting a container size, and a controller that receives the selected heat setting and the selected container size for controlling the duty cycle of the at least one heating element.

* * * * *